US010822975B2

(12) United States Patent
Kline et al.

(10) Patent No.: US 10,822,975 B2
(45) Date of Patent: Nov. 3, 2020

(54) VANE SYSTEM WITH CONNECTORS OF DIFFERENT LENGTH

(71) Applicant: United Technologies Corporation, Farmington, CT (US)

(72) Inventors: Bradley P. Kline, Middletown, CT (US); Farruqh Shahab, Rockville, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 58 days.

(21) Appl. No.: 16/020,079

(22) Filed: Jun. 27, 2018

(65) Prior Publication Data

US 2020/0003064 A1  Jan. 2, 2020

(51) Int. Cl.
*F01D 9/04* (2006.01)

(52) U.S. Cl.
CPC .......... *F01D 9/042* (2013.01); *F05D 2220/32* (2013.01); *F05D 2240/12* (2013.01); *F05D 2240/80* (2013.01)

(58) Field of Classification Search
CPC .......... F01D 9/04; F01D 9/042; F01D 25/243; F01D 25/246
See application file for complete search history.

(56) References Cited

U.S. PATENT DOCUMENTS

| 3,275,294 | A | * | 9/1966 | Allen | F01D 9/041 415/115 |
| 4,395,195 | A | * | 7/1983 | De Cosmo | F01D 9/042 415/137 |
| 5,482,433 | A | * | 1/1996 | Norris | F01D 5/22 415/173.7 |
| 6,196,794 | B1 | * | 3/2001 | Matsumoto | B29C 65/5042 415/191 |
| 6,425,738 | B1 | * | 7/2002 | Shaw | F01D 9/041 415/208.1 |
| 6,910,854 | B2 | * | 6/2005 | Joslin | F01D 5/225 415/139 |
| 8,092,165 | B2 | | 1/2012 | Bouchard et al. | |
| 8,128,354 | B2 | * | 3/2012 | Hansen | F01D 5/225 415/191 |
| 8,678,752 | B2 | * | 3/2014 | Delvaux | F01D 5/142 415/119 |
| 9,334,756 | B2 | * | 5/2016 | Ring | F01D 9/042 |

(Continued)

*Primary Examiner* — Ninh H. Nguyen
*Assistant Examiner* — Aye S Htay
(74) *Attorney, Agent, or Firm* — Carlson, Gaskey & Olds, P.C.

(57) ABSTRACT

A vane system includes vane segments that each have a platform, a connector box, and at least one airfoil extending between the platform and the connector box. The connector box has a first circumferential side in the form of a male connector and a second circumferential side in the form of a female socket. The vane segments are connected together in a circumferential row with the male connector of each said vane segment being received in the female socket of the next vane segment in the circumferential row. A majority of the male connectors are of a first, common connector length, and at least one of the male connectors is of a second connector length that is different than the common connector length.

20 Claims, 4 Drawing Sheets

(56) References Cited

U.S. PATENT DOCUMENTS

| | | | |
|---|---|---|---|
| 2014/0248140 A1* | 9/2014 | Jacques | F01D 9/042 |
| | | | 415/183 |
| 2016/0115800 A1* | 4/2016 | Lyders | F01D 9/04 |
| | | | 415/208.1 |
| 2016/0130960 A1* | 5/2016 | Cortequisse | F01D 5/02 |
| | | | 415/173.4 |
| 2016/0230574 A1* | 8/2016 | Simonds | F01D 11/001 |

* cited by examiner

VANE SYSTEM WITH CONNECTORS OF DIFFERENT LENGTH

STATEMENT REGARDING FEDERALLY SPONSORED RESEARCH OR DEVELOPMENT

This invention was made with Government support awarded by the United States. The Government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A vane system according to an example of the present disclosure includes a plurality of vane segments. Each vane segment has a platform, a connector box, and at least one airfoil that extends between the platform and the connector box. The connector box has a first circumferential side in the form of a male connector and a second circumferential side in the form of a female socket. The vane segments are connected together in a circumferential row with the male connector of each vane segment being received in the female socket of the next vane segment in the circumferential row. A majority of the male connectors are of a first, common connector length, and at least one of the male connectors is of a second connector length that is different than the common connector length.

In a further embodiment of any of the foregoing embodiments, the first connector length and the second connector length are the distance from a base of the male connector to a tip of the male connector.

In a further embodiment of any of the foregoing embodiments, the second connector length is greater than the first connector length.

In a further embodiment of any of the foregoing embodiments, each male connector, inclusive of the male connectors that have the first connector length and the at least one male connector that has the second connector length, extends a common distance into the corresponding female socket of the next vane segment in the circumferential row.

In a further embodiment of any of the foregoing embodiments, the at least one male connector that has the second connector length is located in the circumferential row at a 3 o'clock position.

In a further embodiment of any of the foregoing embodiments, the at least one male connector that has the second connector length includes first and second male connector that each have the second connector length, and the first and second male connectors are offset from each other by 180° in the circumferential row.

A further embodiment of any of the foregoing embodiments includes an anti-rotation stop member adjacent the male connector that has the second connector length, the anti-rotation stop member preventing rotation of the vane segments.

In a further embodiment of any of the foregoing embodiments, the second connector length is a function of a radial length of the vane segments and a size of the anti-rotation stop member.

A gas turbine engine according to an example of the present disclosure includes a compressor section, a combustor in fluid communication with the compressor section, and a turbine section in fluid communication with the combustor. At least one of the compressor section or the turbine section includes a plurality of vane segments. Each vane segment has a platform, a connector box, and at least one airfoil that extends between the platform and the connector box. The connector box has a first circumferential side in the form of a male connector and a second circumferential side in the form of a female socket. The vane segments are connected together in a circumferential row with the male connector of each vane segment being received in the female socket of the next vane segment in the circumferential row. A majority of the male connectors are of a first, common connector length, and at least one of the male connectors is of a second connector length that is different than the common connector length.

In a further embodiment of any of the foregoing embodiments, the first connector length and the second connector length are the distance from a base of the male connector to a tip of the male connector.

In a further embodiment of any of the foregoing embodiments, the second connector length is greater than the first connector length.

In a further embodiment of any of the foregoing embodiments, each male connector, inclusive of the male connectors that have the first connector length and the at least one male connector that has the second connector length, extends a common distance into the corresponding female socket of the next vane segment in the circumferential row.

In a further embodiment of any of the foregoing embodiments, the at least one male connector that has the second connector length is located in the circumferential row at a 3 o'clock position.

In a further embodiment of any of the foregoing embodiments, the at least one male connector that has the second connector length includes first and second male connector that each have the second connector length, and the first and second male connectors are offset from each other by 180° in the circumferential row.

A further embodiment of any of the foregoing embodiments includes an anti-rotation stop member adjacent the male connector that has the second connector length, the anti-rotation stop member preventing rotation of the vane segments.

In a further embodiment of any of the foregoing embodiments, the second connector length is a function of a radial length of the vane segments and a size of the anti-rotation stop member.

A vane system according to an example of the present disclosure includes a plurality of vane segments. Each vane segment has a platform, a connector box, and at least one airfoil that extends between the platform and the connector box. The connector box has a first circumferential side in the form of a male connector and a second circumferential side in the form of a female socket. The vane segments are connected together in a circumferential row with the male connector of each vane segment being received in the female socket of the next vane segment in the circumferential row. A majority of the male connectors are of a first, common connector length, at least one of the male connectors is of a second connector length that is greater than the first connector length, and each male connector extends a common distance into the corresponding female socket of the next vane segment in the circumferential row.

In a further embodiment of any of the foregoing embodiments, the second connector length is greater than the first connector length by 250% to 300%.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
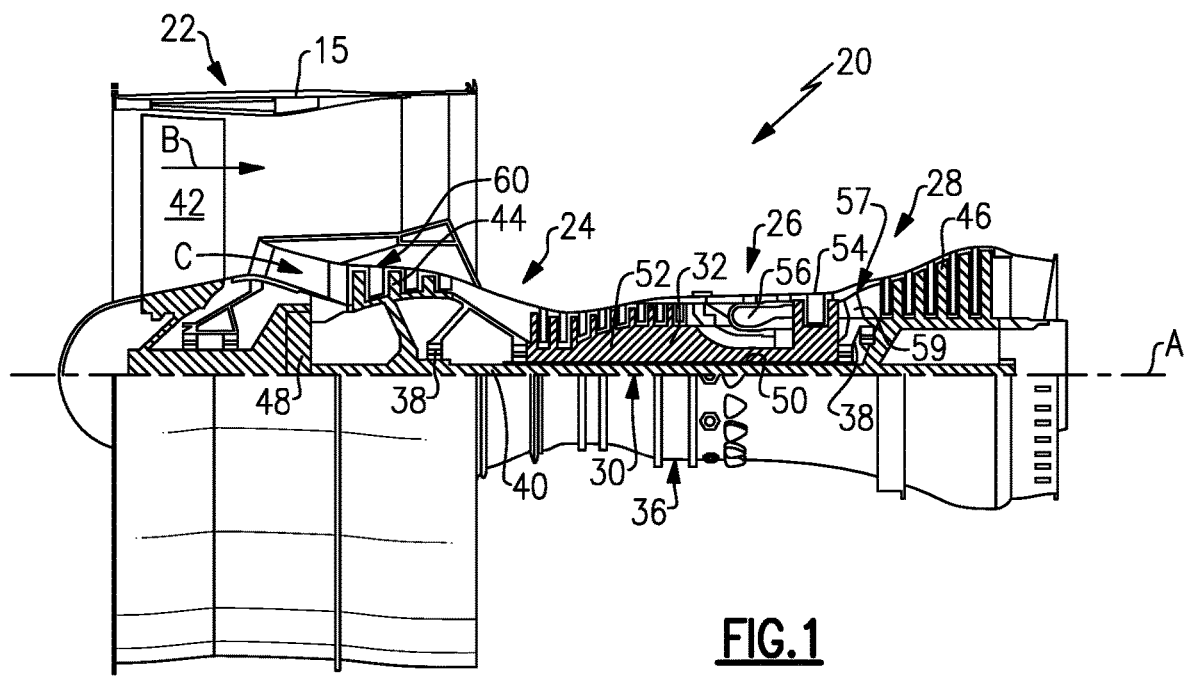
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
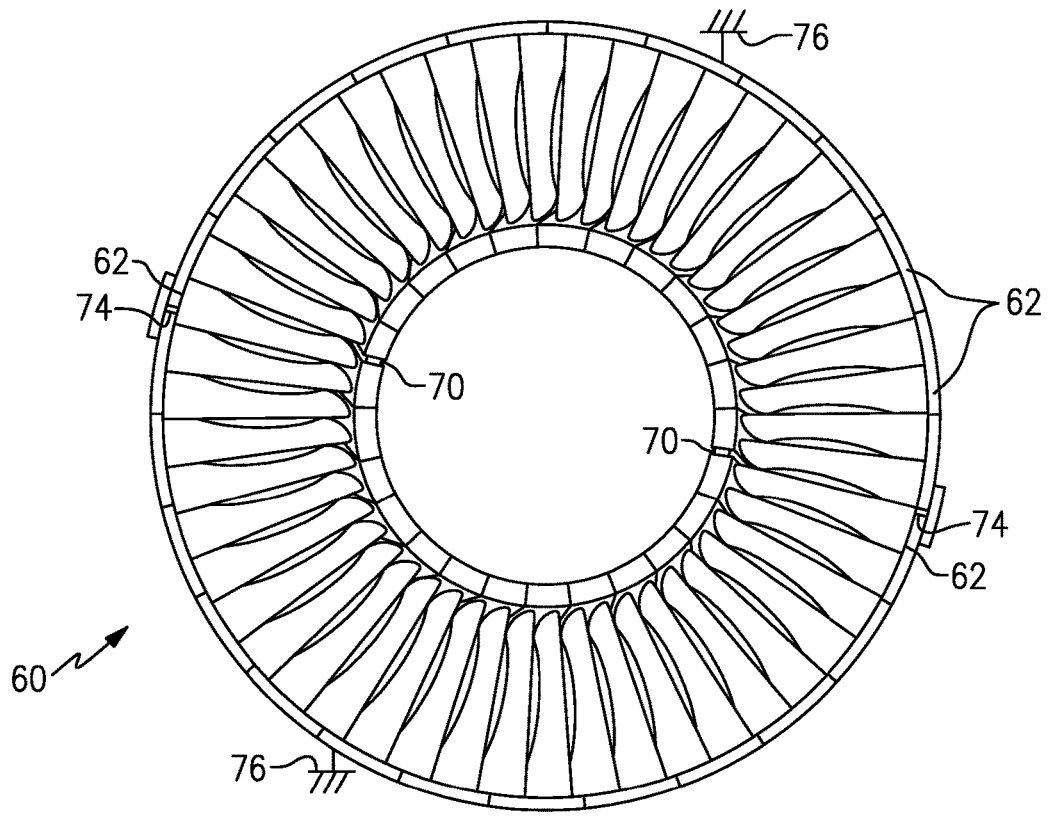
FIG. 2 illustrates an example of a vane system of the engine.
Figure 3:
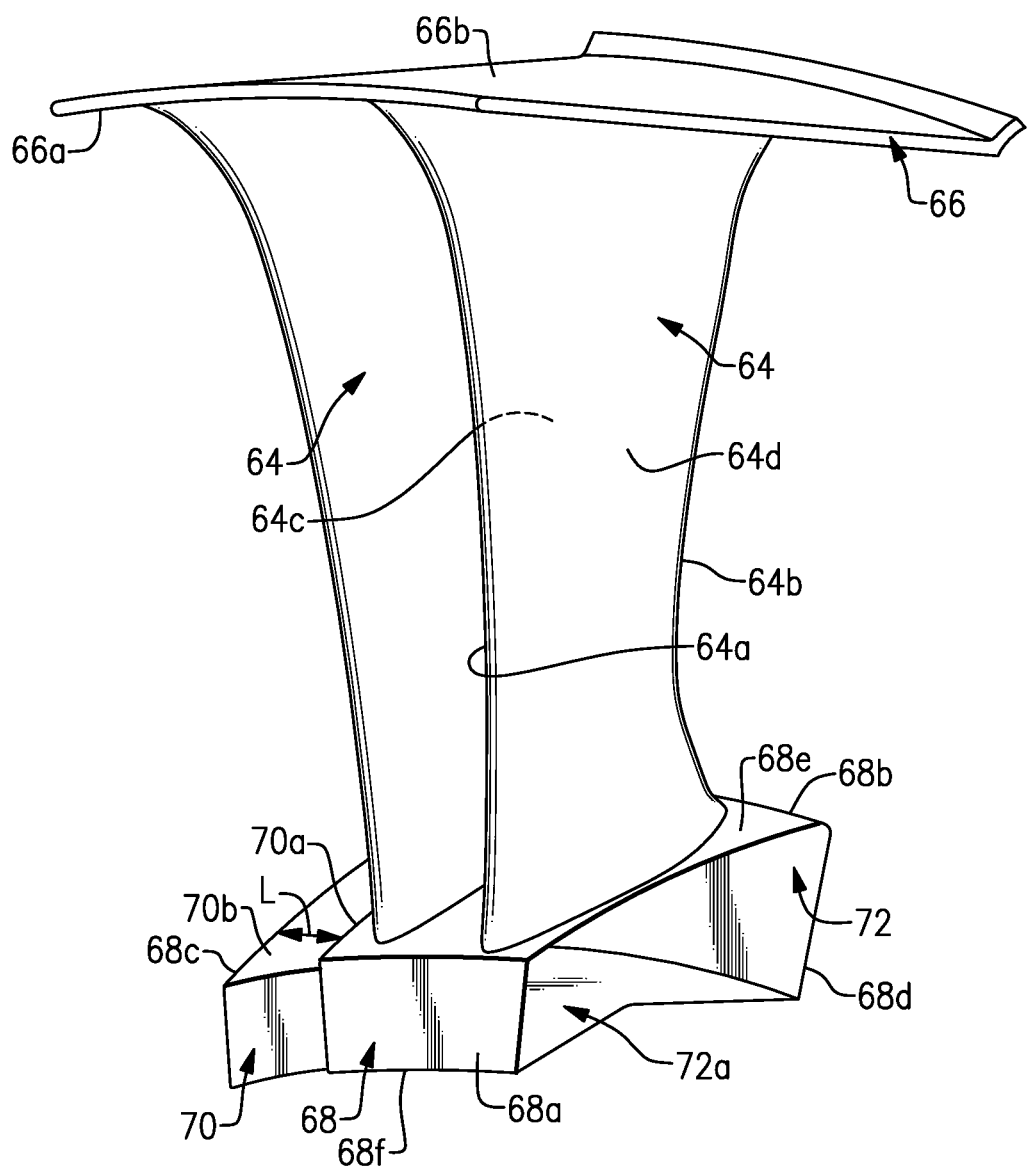
FIG. 3 illustrates a vane segment of the vane system.

The engine 20 includes a vane system 60 that includes a circumferential row of vane segments 62. In this example, the vane system 60 is in the compressor section 24. FIG. 2 illustrates an isolated view of the circumferential row of vane segments 62, and FIG. 3 illustrates an example of one of the vane segments 62. In this example, the vanes segments 62 are vane doublets. Such segments are arranged circumferentially to form the circumferential row. The vane doublet includes two airfoils 64 that share a common outer diameter platform 66 and an inner diameter connector box 68. Alternatively, the vane segment 62 may be a singlet that has only one airfoil 64 or a multiplet that has more than two airfoils 64 (e.g., 3, 4, or 5 airfoils).

Each airfoil 64 includes a leading and trailing ends 64a/64b, and first and second sides 64c/64d (typically pressure and suction sides). The platform 66 includes a first or gaspath side 66a and a second or non-gaspath side 66b. Here, gaspath and non-gaspath are made with reference to the main bypass airflow. The gaspath side 66a bounds the main bypass airflow in the bypass flow path B of the engine 20.

The connector box 68 has a first or leading side 68a, a second or trailing side 68b, a first circumferential side 68c, a second circumferential side 68d, and gaspath and non-gaspath sides 68e/68f. The first circumferential side 68c is in the form of a male connector 70 and the second circumferential side 68d is in the form of a female socket 72. As will be appreciated, alternatively the first circumferential side 68c may be in the form of the female socket 72 and the second circumferential side 68d may be in the form of the male connector 70.

Each male connector 70 is a tapered or narrowed portion of the connector box 68 that extends from a base 70a to a tip end 70b opposite the base 70a. In this example, the base 70a is defined by a step in the connector box 68 where the connector box 68 tapers or narrows (this may also be referred to as a swage). The male connector 70 defines a connector length (L). For example, the connector length (L) is the distance from the base 70a to the tip end 70b. The connector length (L) may vary across the male connector 70, however, for purposes of comparison of connector lengths (L) between vane segments 62, the connector distance (L) is taken from common points on the vane segments 62, such as a leading end corner on the step of the base 70a and a leading end corner on tip end 70b. Alternatively, the reference points can be at an intermediate position along the male connector 70.

Each female socket 72 includes an opening 72a in the second circumferential side 68d of the connector box 68. The opening 72a is defined on its periphery by the walls of the connector box 68. The opening 72a is generally slightly larger than the male connector 70 such that the male connector 70 can be received therein.

Figure 4:
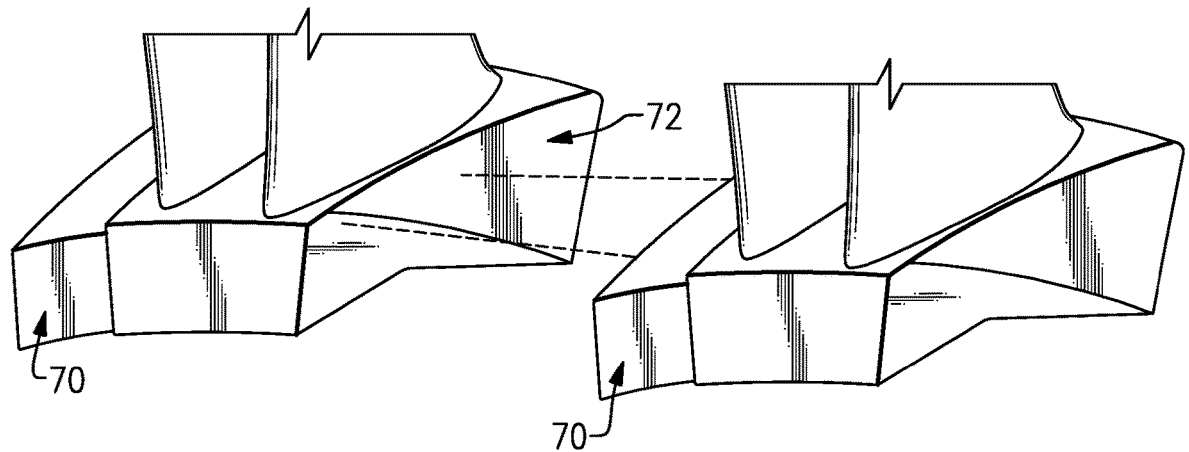
FIG. 4 illustrates a fit between adjacent vane segments of the vane system.

As depicted in FIG. 4, the male connectors 70 are received into the female sockets 72 to connect the vane segments 62 together and the inner diameter. In that regard, the geometry of the female socket 72 is complementary to the geometry of the male connector 70. For example, the geometries may be complimentary such that there is an interference fit between adjacent vane segments 62.

Figure 5:
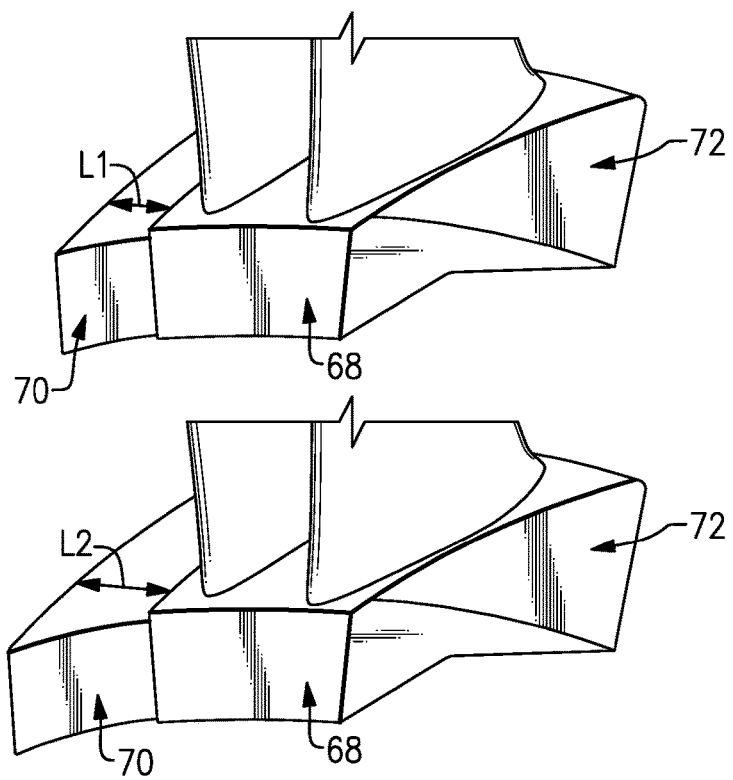
FIG. 5 illustrates vane segments with male connectors of two different connector lengths.

The vane segments 62 are not all identical with regard to the connector lengths (L) of the male connectors 70. FIG. 5 shows portions of two connector boxes 68. The male connectors 70 of some of the vane segments 62, represented by the top connector box 68 in FIG. 5, are of a first, common connector length (L1). At least one of the male connectors 70, represented by the bottom connector box 68 in FIG. 5, is of a second connector length (L2) that is different than the common connector length (L1). For instance, a majority (more than half) of the vane segments 62 of the vane system 60 have the male connectors 70 of the common connector length (L1) and fewer than half of the vane segments 62 have male connectors 70 of the second connector length (L2).

In one example, the second connector length (L2) is greater than the first connector length (L1). For instance, referring to FIG. 2, the number and location of vane segments 62 that have the second connector length (L2) corresponds to one or more anti-rotation stop members 74. The anti-rotation stop members 74 prevent the vane system 60 from rotating. Although the vane system 60 does not function to rotate as a rotor does, airflow across the airfoils 64 exerts aerodynamic forces in the circumferential direction and thus tends to rotate the vane system 60 but for the anti-rotation stop members 74 that are secured with a static structure 76, such as a case. For example, the anti-rotation stop members 74 extend radially between the platforms 66 of adjacent vane segments 62. As shown, there is one anti-rotation stop member 74 at approximately the 3 o'clock position on the vane system 60 and a second anti-rotation stop members 74 at approximately the 9 o'clock position. As will be appreciated, these positions are relative to the orientation of the vane system 60 in the engine 20, where 12 o'clock is top dead center.

At the locations, the anti-rotation stop members 74 create a gap between adjacent vane segments 62 by extending between the adjacent platforms 66. That is, the platforms 66 of the vane segments 62 that are not next to the anti-rotation stop members 74 contact each other or are at least close together, but the platforms 66 next to the anti-rotation stop members 74 contact the anti-rotation stop members 74 on one side rather than the platform of the next vane segment 62. The spacing at the platforms 66 also affects the spacing at the connector boxes 68 at the inner diameter. The connector boxes 68 of the vane segments 62 that are not next to the anti-rotation stop members 74 are close together, while there is a larger spacing between the connector boxes 68 of the vane segments 62 on either side of the anti-rotation stop member 74. In this regard, the vane segments 62 that are not next to the anti-rotation stop member 74 all have male connectors 70 with the first, common connector length (L1). The vane segments 62 that are next to the anti-rotation stop members 74 have male connectors 70 with the second, greater connector length (L2) in order to span across the gap caused by the anti-rotation stop member 74 and into the female socket 72 of the next vane segment 62. In one example, the second connector length (L2) is greater than the first connector length (L1) by 250% to 300%. In the example in FIG. 2, there would be first and second male connectors 70 of the second connector length (L2) located at the 3 o'clock position and the 9 o'clock position, offset 180°.

Figure 6A:
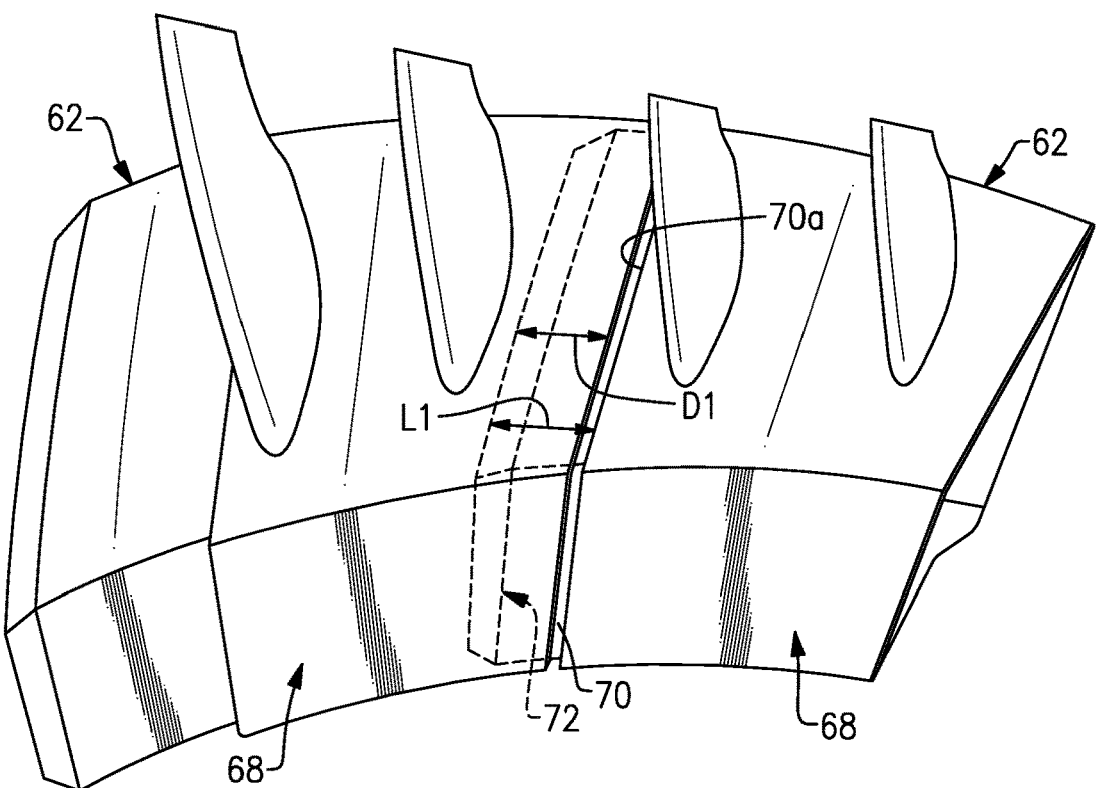
FIG. 6A illustrates a fit between vane segments that are not next to an anti-rotation stop member.
Figure 6B:
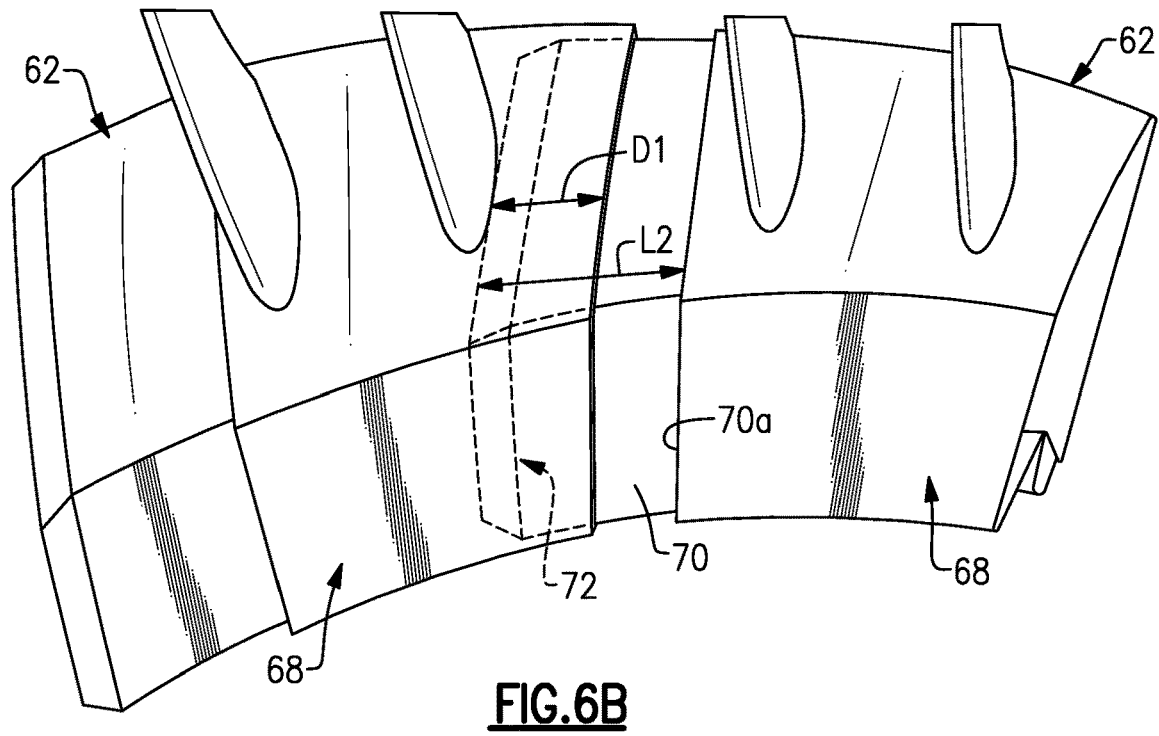
FIG. 6B illustrates a fit between vane segments that are next to an anti-rotation stop member.

FIGS. 6A and 6B illustrate respective examples of the fit between connector boxes 68. In FIG. 6A the vane segments 62 are ones that are not next to the anti-rotation stop member 74. The male connector 70 thus has the first, common connector length (L1). In this example, the male connector 70 fits entirely or substantially entirely into the female socket 72 such that the step at the base 70a acts as a stop. In FIG. 6B the vane segments 62 are ones that are next to the anti-rotation stop member 74. The male connector 70 is thus of the second, greater connector length (L2). In this example, the male connector 70 does not fit entirely into the female socket 72 and a portion of the male connector 70 thus remains exposed in the final position.

In an additional example, to ensure a proper and uniform fit, the male connectors 70 extend a common distance into the female sockets 72. The common distance may be selected to be greater than a minimum distance required for a proper fit, to ensure a fit margin. As shown in FIG. 6A, all of the male connectors 70 of the vane segments 62 that are not next to the anti-rotation stop member 74 extend a distance D1 into the female sockets 72. The male connector 70 of the vane segments 62 that are next to the anti-rotation stop member 74 also extend the same (common) distance D1 into the female socket 72 even though the male connector is of the longer connector length (L2). That is, the second connector length (L2) is selected in accordance with the size of the gap between the vane segments 62 that are next to the anti-rotation stop member 74. The second connector length (L2) is further a function of the size of the anti-rotation stop member 74 (the circumferential span) and the radial span of the vane segments.

In one example, the function can be represented as:

$$L2 = [(W + T1*N)*R2/R1] + D1, \text{ where}$$

N is the number of vane segments 62 spanning the distance between anti-rotation stops 74;

T1 is the tolerance on circumferential length of the platform 66, in inches;

W is the width of upstanding flange of an anti-rotation stop 74 (the circumferential span), in inches;

R1 is the distance from the engine centerline to platform 66, in inches; and R2 is the distance the engine centerline to the inner diameter of the connector box 68, in inches. In all instances, equivalent units may be used instead of inches.

The sizing of the male connectors 70 such that a majority have the first connector length (L1) and only a few have the second connector length (L2) also facilitates weight reduction. For instance, if all of the vane segments were of common geometry and of common connector length, the connector lengths would all need to be the longer connector length in order to ensure that the male connector of whichever vane segment was next to the anti-rotation stop member could sufficiently cross the gap and properly fit into the female socket. By using the male connectors 70 of different sizes, the vane system 60 thus only uses the longer connector length (L2) at the anti-rotation stop members 74, thereby allowing the connector length (L1) of the other male connectors 70 that are not next to the anti-rotation stop member 74 to be shorter.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane system comprising:
a plurality of vane segments, each vane segment having a platform, a connector box, and at least one airfoil extending between the platform and the connector box, the connector box including a forward wall, an aft wall, a gaspath wall, and a non-gaspath wall that together circumscribe an open interior, the connector box having a first circumferential side in the form of a male connector and a second circumferential side in the form of a female socket, the vane segments being connected together in a circumferential row with the male connector of each said vane segment being received in the female socket of the next vane segment in the circumferential row, a majority of the male connectors being of a first, common connector length, and at least one of the male connectors being of a second connector length that is different than the common connector length.

2. The vane system as recited in claim 1, wherein the first connector length and the second connector length are the distance from a base of the male connector to a tip of the male connector.

3. The vane system as recited in claim 1, wherein the second connector length is greater than the first connector length.

4. The vane system as recited in claim 1, wherein each said male connector, inclusive of the male connectors that have the first connector length and the at least one male connector that has the second connector length, extends a common distance into the corresponding female socket of the next vane segment in the circumferential row.

5. The vane system as recited in claim 1, wherein the at least one male connector that has the second connector length is located in the circumferential row at a 3 o'clock position.

6. The vane system as recited in claim 1, wherein the at least one male connector that has the second connector length includes first and second male connector that each have the second connector length, and the first and second male connectors are offset from each other by 180° in the circumferential row.

7. A gas turbine engine comprising:
a compressor section;
a combustor in fluid communication with the compressor section; and
a turbine section in fluid communication with the combustor,
wherein at least one of the compressor section or the turbine section includes,
a plurality of vane segments, each vane segment having a platform, a connector box, and at least one airfoil extending between the platform and the connector box, the connector box including a forward wall, an aft wall, a gaspath wall, and a non-gaspath wall that together circumscribe an open interior, the connector box having a first circumferential side in the form of a male connector and a second circumferential side in the form of a female socket, the vane segments being connected together in a circumferential row with the male connector of each said vane segment being received in the female socket of the next vane segment in the circumferential row, a majority of the male connectors being of a first, common connector length, and at least one of the male connectors being of a second connector length that is different than the common connector length.

8. The gas turbine engine as recited in claim 7, wherein the first connector length and the second connector length are the distance from a base of the male connector to a tip of the male connector.

9. The gas turbine engine as recited in claim 8, wherein the second connector length is greater than the first connector length.

10. The gas turbine engine as recited in claim 8, wherein each said male connector, inclusive of the male connectors that have the first connector length and the at least one male connector that has the second connector length, extends a common distance into the corresponding female socket of the next vane segment in the circumferential row.

11. The gas turbine engine as recited in claim 8, wherein the at least one male connector that has the second connector length includes first and second male connector that each have the second connector length, and the first and second male connectors are offset from each other by 180° in the circumferential row.

12. The gas turbine engine as recited in claim 8, further comprising an anti-rotation stop member adjacent the male connector that has the second connector length, the anti-rotation stop member preventing rotation of the vane segments.

13. The gas turbine engine as recited in claim 12, wherein the second connector length is a function of a radial length of the vane segments and a size of the anti-rotation stop member.

14. A vane system comprising:
a plurality of vane segments, each vane segment having a platform, a connector box, and at least one airfoil extending between the platform and the connector box, the connector box including a forward wall, an aft wall, a gaspath wall, and a non-gaspath wall that together circumscribe an open interior, the connector box having a first circumferential side in the form of a male connector and a second circumferential side in the form of a female socket, the vane segments being connected together in a circumferential row with the male connector of each said vane segment being received in the female socket of the next vane segment in the circumferential row, a majority of the male connectors being of a first, common connector length, at least one of the male connectors being of a second connector length that is greater than the first connector length, and each said male connector extends a common distance into the corresponding female socket of the next vane segment in the circumferential row.

15. The vane system as recited in claim 14, wherein the second connector length is greater than the first connector length by 250% to 300%.

16. The vane system as recited in claim 1, wherein the male connector extends from a base defined by a step in the connector box.

17. The vane system as recited in claim 16, wherein the step extends in the forward wall, the aft wall, the gaspath wall, and the non-gaspath.

18. The vane system as recited in claim 16, wherein the step of the male connector serves as a stop and limits how far the male connector of common connector length is received into the female connector.

19. The vane system as recited in claim 1, wherein the platform is at a radial end of the at least one airfoil and the connector box is at an opposed radial end of the at least one airfoil.

20. The vane system as recited in claim 1, the male connector of each said vane segment is received in the open interior in the female socket of the next vane segment.

* * * * *